Aug. 17, 1948. T. J. PUTZ 2,447,136
LOCOMOTIVE REVERSING GEARING APPARATUS
Filed June 28, 1946 2 Sheets-Sheet 1
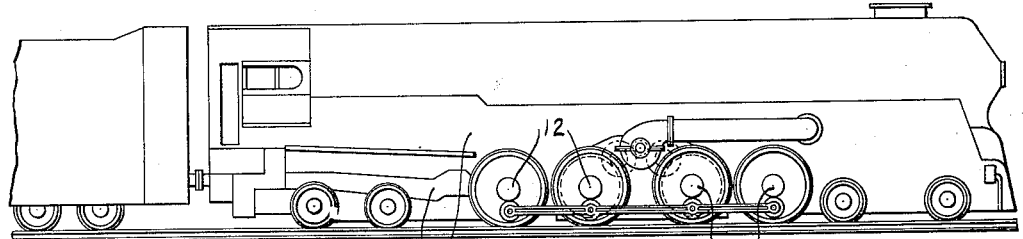
FIG. 1.
FIG. 2.
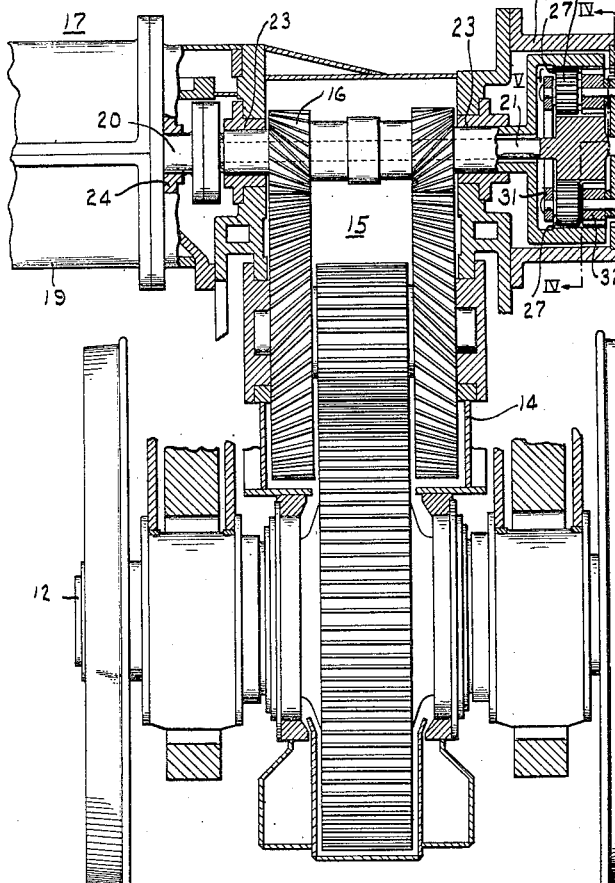
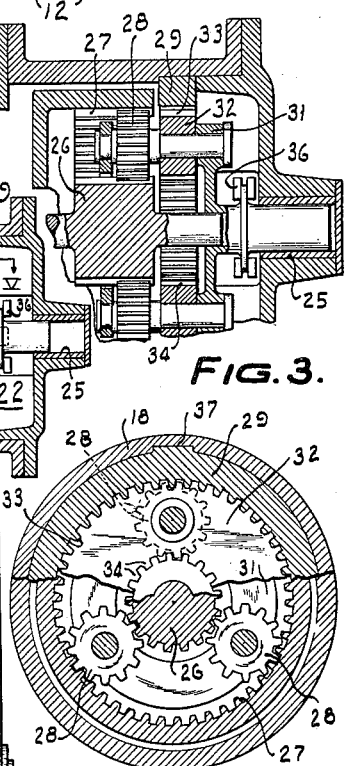
FIG. 3.
FIG. 4.
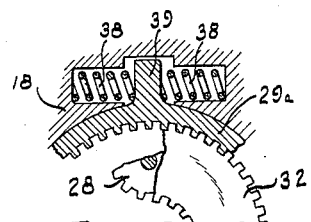
FIG. 6.
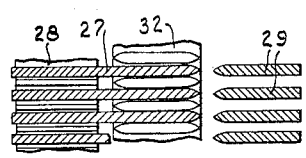
FIG. 5.
INVENTOR
THOMAS J. PUTZ
BY  A. B. Rivers
ATTORNEY Aug. 17, 1948.  T. J. PUTZ  2,447,136
LOCOMOTIVE REVERSING GEARING APPARATUS
Filed June 28, 1946  2 Sheets-Sheet 2

WITNESSES:

INVENTOR
THOMAS J. PUTZ
BY
ATTORNEY

Patented Aug. 17, 1948

2,447,136

UNITED STATES PATENT OFFICE 2,447,136

LOCOMOTIVE REVERSING GEARING APPARATUS

Thomas J. Putz, Upper Darby, Pa., assignor to Westinghouse Electric Corporation, East Pittsburgh, Pa., a corporation of Pennsylvania Application June 28, 1946, Serial No. 680,178

9 Claims. (Cl. 74—298)

The invention relates to forward and reverse gearing and it has for its object to provide apparatus of this character involving a planetary train with a toothed ring rotatable with the planet carrier and movable to one position to lock the elements of the train together as a unit for rotation of the driven element in one direction and movable in the other direction to mesh with an anchor gear and thereby lock the planet carrier against rotation for rotation of the driven element in the other direction.

Another object of the invention is to provide, for planetary gearing arranged in a casing and an anchor gear rotatably carried by the casing, a brake for the anchor gear and a toothed ring rotatable with the planet carrier and movable to mesh with teeth of the planetary gearing for rotation of the driven element in one direction or to mesh with teeth of the anchor gear for rotation of the driven element in the other direction when the brake is operated to clutch the anchor gear to the casing.

A further object of the invention is to provide a power-developing and transmitting unit wherein power is transmitted by reduction gearing carried by a housing structure and including a driving quill pinion together with a prime mover carried by said structure and having a quill shaft extending through the quill pinion and connected to the latter at the end remote from the prime mover by means of forward and reverse gearing in a casing carried by the housing structure.

The foregoing and other objects are effected by the invention as will be apparent from the following description and claims taken in connection with the accompanying drawings, forming a part of this application, in which:

Fig. 1 is a side elevational view of a locomotive showing the invention applied thereto;

Fig. 2 is a view showing, in section, the combined reversing and reduction gearing for transmitting power from the turbine to traction wheels;

Figs. 3 and 4 are longitudinal and transverse sectional views of the reversing gearing, Fig. 4 being taken along the line IV—IV of Fig. 2;

Fig. 5 is a sectional view taken along the line V—V of Fig. 2 and looking in the direction of the arrows;

Fig. 6 is a fragmentary sectional view showing a second embodiment of the reversing gearing.

Figure 7:
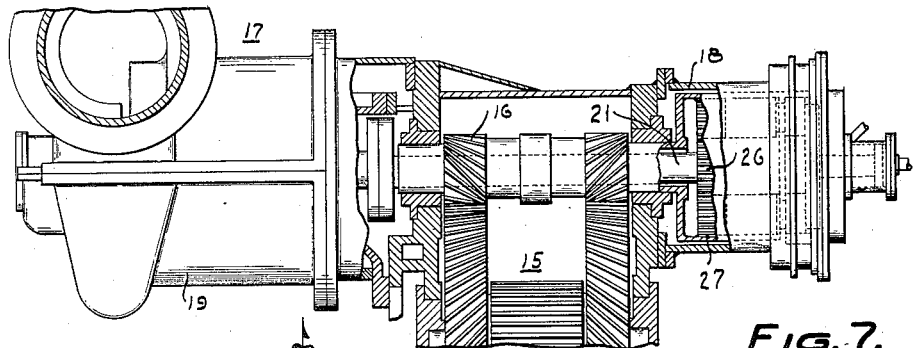
Figs. 7 and 8 are sectional views showing a third embodiment of the invention.

In Fig. 1, there is shown a locomotive 10 having a frame 11 supported by axles including driving axles 12. A housing structure, at 14, is supported by the frame 11, and it rotatably supports therewithin reduction gearing, at 15, for transmitting power to the driving axles 12, the reduction gearing including a driving quill pinion 16. The housing structure carries a turbine, at 17, and a gear casing 18 adjacent to opposite ends of the quill pinion and in coaxial relation with respect to the latter.

The turbine includes a casing 19 attached to the housing and rotatably supporting the rotor 20. The rotor is connected by a quill shaft 21, extending through the quill pinion, and reversing gearing, at 22, in the casing 18, connects the end of the quill shaft remote from the turbine to the remote end of the quill pinion. The quill pinion is supported by housing bearings 23, 23 and the quill shaft is supported by the turbine bearing 24 and the gear case bearing 25 so as to be free of the quill pinion.

The reversing gearing, at 22, includes a sun gear 26 connected to the quill shaft, an internal orbit or ring gear 27 connected to the quill pinion 16, a plurality of planet pinions 28, an internal anchor gear 29 of the same pitch diameter as the orbit gear and carried by the gear casing 18 in axial alignment therewith, a carrier 31 for the planet pinions and provided with a ring 32 having external teeth 33 adapted to mesh with the internal teeth of the orbit gear 27 or with the internal teeth of the fixed or anchor gear 29 and also preferably having internal teeth 34 adapted to mesh with the external teeth of the sun gear 26.

The ring 32 is nonrotatably connected to the carrier and it is shiftable to engage the external and internal teeth 33 and 34 thereof with the teeth of the orbit and sun gears to lock together the elements of the planetary train as a unit, so that the orbit gear moves with the sun gear in the same direction, or to engage the external teeth 33 with the teeth of the anchor gear 29 and disengage the internal teeth 34 from the sun gear to hold the carrier against rotation so that the planet pinions are effective to rotate the orbit gear in a direction opposite to that of the sun gear.

Preferably, as shown, the ring 32 is fixedly connected to the carrier 31 and the latter is shifted to shift the ring for the purposes just indicated. The teeth of the sun and orbit gears are enough longer than those of the planet pinions that, with the latter at all times meshing with the sun and orbit gears, the ring may be moved out of mesh with the latter and into mesh with the anchor gear. Also, it will be apparent that, with the ring nonrotatably connected to the carrier, a single row of teeth would be adequate to lock the train together as a unit or to lock the carrier to the anchor gear; however, a ring having both internal and external teeth is preferred for the reason that, in forward driving position, the ring takes the driving torque instead of such torque being transmitted through the planet pinions and the carrier to the ring and in consequence of which the carrier and pinion aggregate would be subject to a torsional or twisting effect.

Shifting of the carrier 31 for rotation of the orbit gear in the same direction as the sun gear or for rotation thereof in the opposite direction may be effected in any suitable manner. For example, there is shown a shifter 36 for this purpose.

To facilitate engagement of the external teeth 33 of the carrier ring either with the orbit gear 27 or with the anchor gear 29 and engagement of the carrier ring teeth 34 with the sun gear 26, the engageable ends of teeth may be tapered or chamfered as shown in Fig. 5.

Also, assuming that the gearing is applied to a locomotive so that the latter is driven ahead with the carrier ring teeth 33 and 34 meshing with the sun and orbit gear teeth or is driven backwards with the carrier ring external teeth 33 meshing with the anchor gear 29, the latter may, instead of being rigidly connected to the casing, as shown at 37 in Fig. 4, be mounted in a floating manner, as shown in Fig. 6, to facilitate shifting from ahead to reverse with the locomotive brakes applied. To this end, in Fig. 6, the gear 29 is shown as mounted on the casing so as to have a limited amount of rotational movement against the force of centering springs 38—38 engaging opposite sides of the gear lug 39 and which yield to permit of the gear moving to the extent required to accommodate its teeth with the carrier ring teeth being meshed therewith.

Figure 8:
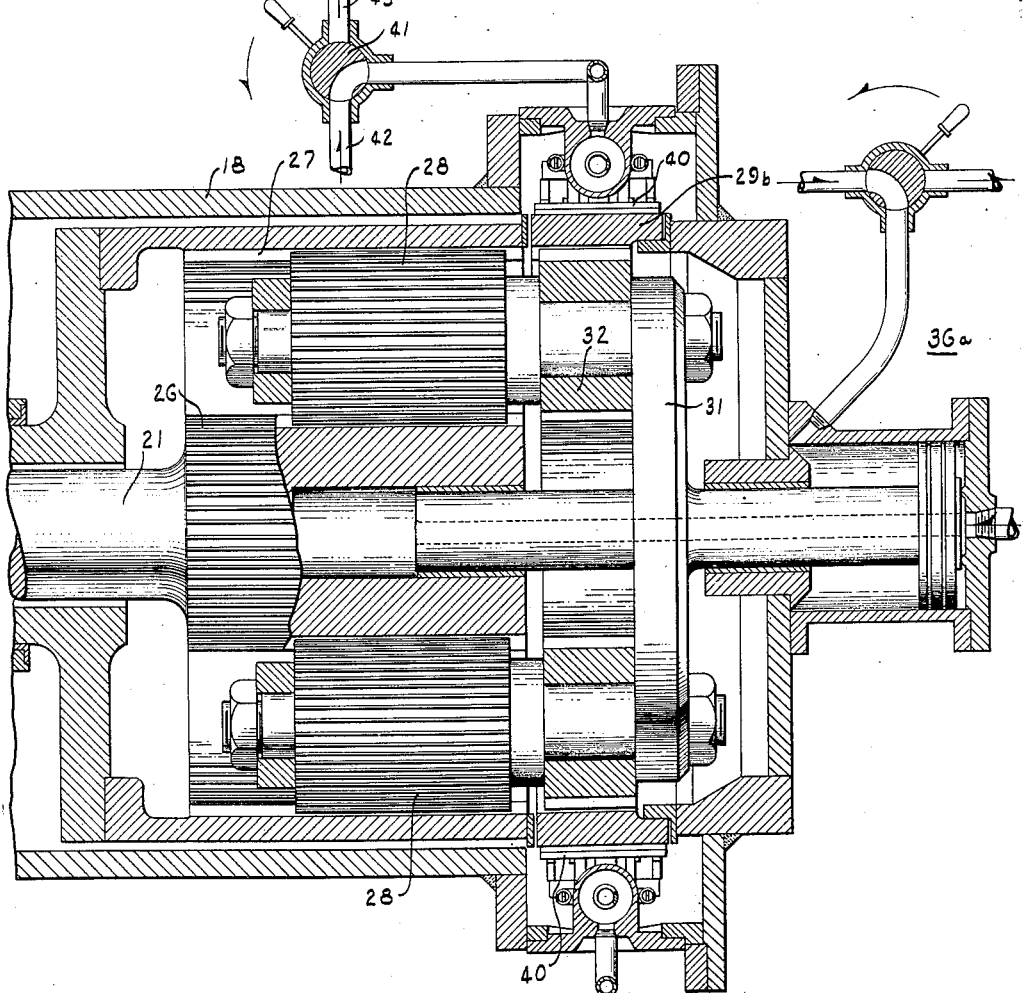

In Figs. 7 and 8, there is shown a further modificaion wherein the anchor gear 29b is rotatably carried by the casing 18 and a brake 40 serves, when applied, to clutch the anchor gear to the casing. The brake is applied only when the ring 32 is out of mesh with the sun and orbit gears and meshes with the anchor gear. While any suitable brake may be used, there is shown one of the hydraulic type wherein a valve 41 is operated for application and release of the brake, the valve being movable to connect the operating devices either with the pressure supply connection 42 for brake application or with the drain or exhaust connection 43 for brake release. By having the anchor gear free to rotate, meshing of the ring therewith is facilitated. Fig. 8 also shows hydraulic means, at 36a, for shifting the carrier 31.

While the invention has been shown in several forms, it will be obvious to those skilled in the art that it is not so limited, but is susceptible of various other changes and modifications without departing from the spirit thereof.

What is claimed is:

1. In forward and reverse gearing, a casing for the gearing, a driving sun gear, a driven orbit gear, an anchor gear aligned with the orbit gear and mounted on the casing, a plurality of planet pinions meshing with the sun and orbit gears, a carrier for the planet pinions, a ring rotatable with the carrier and provided with teeth which are meshable either with the teeth of the orbit gear or with the teeth of the anchor gear, means for shifting the ring to forward driving position in which said teeth thereof mesh with the orbit gear teeth and to reverse driving position in which such teeth mesh with the anchor gear teeth, and means for restraining rotation of the anchor gear relative to the casing.

2. Apparatus as claimed in claim 1 wherein the anchor gear is rotatably mounted on the casing and the means for restraining rotation thereof includes opposed centering springs.

3. Apparatus as claimed in claim 1 wherein the anchor gear is rotatably carried by the casing and the means for restraining rotation thereof relative to the casing is comprised by a brake for clutching it to the casing.

4. In forward and reverse gearing, a casing for the gearing, a driving sun gear, a driven orbit gear, an anchor gear aligned with the orbit gear, planet pinions meshing with the sun and orbit gears, a carrier for the planet pinions, a ring connected to rotate with the carrier and provided with teeth, means for shifting the ring to forward driving position in which the teeth thereof mesh with the sun and orbit gear teeth and to reverse driving position in which teeth thereof mesh with the anchor gear teeth, and means for restraining rotation of the anchor gear relative to the casing.

5. In forward and reverse gearing, a casing for the gearing, a sun gear, an orbit gear, an anchor gear aligned with the orbit gear and rotatably mounted on the casing, planet pinions meshing with the sun and orbit gears, a carrier for the planet pinions and including a ring provided with external and internal teeth, means for shifting the carrier to forward driving position in which the external and internal teeth of the ring mesh with the teeth of the orbit and sun gears, respectively, and to reverse driving position in which the external teeth of the ring mesh with the teeth of the anchor gear, and a brake for clutching the anchor gear to the casing.

6. In a power developing and transmitting unit, a housing, reduction gearing in the housing and rotatably supported by the latter, said reduction gearing including a driving quill pinion, a prime mover supported by the housing adjacent to one end of the quill pinion, a gear casing supported by the housing adjacent to the other end of the quill pinion, a quill shaft driven by the prime mover and extending through the quill pinion, and forward and reverse gearing in the gear casing for connecting the quill shaft and the quill pinion; said forward and reverse gearing including a sun gear connected to the quill shaft, an orbit gear connected to the quill pinion, an anchor gear aligned with the orbit gear and carried by the gear casing, planet pinions meshing with the sun and orbit gears, a carrier for the planet pinions, a ring connected to the carrier for rotation with the latter and provided with teeth which are meshable with the teeth of the orbit gear or with the teeth of the anchor gear, means for moving the ring to forward driving position in which said teeth thereof mesh with the orbit gear teeth and to reverse driving position in which such teeth mesh with the teeth of the anchor gear, and means for restraining rotation of the anchor gear relative to the casing.

7. Apparatus as claimed in claim 6 wherein the anchor gear is rotatably carried by the casing and the means for restraining rotation thereof relative to the casing is comprised by a brake which is operative to clutch the anchor gear to the casing.

8. Apparatus as claimed in claim 6 wherein the ring has internal teeth which mesh with the teeth of the sun gear in forward driving position and external teeth which mesh with the teeth of the orbit gear in forward driving position and with the teeth of the anchor gear in reverse driving position.

9. Apparatus as claimed in claim 6 wherein the ring is rigidly attached to the carrier and the latter is moved to move the ring to forward and reverse driving positions.

THOMAS J. PUTZ.

REFERENCES CITED

The following references are of record in the file of this patent:

UNITED STATES PATENTS

| Number | Name | Date |
|---|---|---|
| 1,333,176 | Johnson | Mar. 9, 1920 |
| 1,646,465 | Thompson et al. | Oct. 25, 1927 |
| 2,349,410 | De Normanville | May 23, 1944 |
| 2,361,357 | Schmitter | Oct. 24, 1944 |

FOREIGN PATENTS

| Number | Country | Date |
|---|---|---|
| 178,437 | Switzerland | Oct. 1, 1935 |